United States Patent [19]

Townsend, III

[11] 4,249,412
[45] Feb. 10, 1981

[54] FLUORESCENT LEAK DETECTION COMPOSITION

[76] Inventor: Claude A. Townsend, III, 5611 Havenhill Rd., Birmingham, Ala. 35210

[21] Appl. No.: 968,650

[22] Filed: Dec. 11, 1978

[51] Int. Cl.³ .................. G01M 3/04; C09K 11/02
[52] U.S. Cl. ............................... 73/40.7; 73/49.2; 252/301.16; 252/301.19
[58] Field of Search ............ 73/49.2, 49.3, 40.7; 252/301.19, 301.16

[56] References Cited

U.S. PATENT DOCUMENTS

| Re. 26,888 | 5/1970 | Alburger | 252/301.19 |
|---|---|---|---|
| 2,472,522 | 6/1949 | deForest | 252/301.19 X |
| 2,478,951 | 8/1949 | Stokley et al. | 252/408 |
| 2,635,329 | 4/1953 | deForest et al. | 252/301.19 X |
| 2,636,127 | 4/1943 | deForest et al. | 252/301.19 X |
| 2,707,236 | 4/1955 | deForest | 252/301.19 X |
| 2,806,959 | 9/1957 | deForest et al. | 252/301.19 X |
| 2,878,392 | 3/1959 | Polito | 250/303 |
| 3,028,338 | 4/1962 | Parker | 252/301.19 |
| 3,114,039 | 12/1963 | Switzer | 250/302 |
| 3,184,596 | 5/1965 | Alburger | 252/301.19 X |
| 3,465,146 | 9/1969 | Molina | 252/301.19 X |
| 3,489,703 | 1/1970 | Borucki | 252/301.19 |
| 4,049,568 | 9/1977 | Molina | 252/301.19 |

FOREIGN PATENT DOCUMENTS

| 721213 | 11/1965 | Canada | 252/301.19 |
|---|---|---|---|
| 1092855 | 11/1967 | United Kingdom | 73/49.2 |
| 275490 | 9/1970 | U.S.S.R. | 73/49.2 |

*Primary Examiner*—F. Edmundson
*Attorney, Agent, or Firm*—Seidel, Gonda, Goldhammer & Panitch

[57] ABSTRACT

A fluorescent leak detection composition is provided comprising water, a nonionic surfactant having an HLB value of about 12 to about 14 in an amount effective to produce stable bubbling of the composition for a time sufficient to enable detection of a leak in a container when the composition is applied to the surface thereof, about 0.025 to about 1.0 weight percent sodium fluorescein and a semisynthetic cellulose thickening agent in an amount effective to provide the composition with a viscosity of about 75 to about 125 cps at 20° C. Preferably, an antifreeze agent is added in an amount effective to retard freezing of the composition for at least 5 minutes when the composition is applied to a cold surface, such as refrigeration pipes.

8 Claims, No Drawings

FLUORESCENT LEAK DETECTION COMPOSITION

BACKGROUND OF THE INVENTION

This invention relates to leak detection compositions, and more particularly, to fluorescent leak detection compositions.

Such compositions are used to determine leaks in containers and conduits, such as refrigeration system leaks, oxygen system leaks, liquid propane gas leaks, natural gas leaks, ammonia gas leaks and the like. As used herein, the word "container" means any fully or partially pressurized container receptacle or conduit adapted to contain a fluid which may leak therefrom.

There presently exists a number of leak detection compositions which are applied to a container to indicate leakage of material therefrom by oozing or bubbling of the composition in the area of the leak. However, generally, these compositions, and particularly the soap type solutions, are very thin and tend to run off vertical or rounded surfaces. This is detrimental to the detection of a leak in the container, especially when the leak is a slow leak which may not be apparent immediately.

Another problem with present leak detection compositions is that they do not provide a colored coating of the correct type or thickness to be visible in ambient light, such as room light. With the present compositions, it is very hard to see gaseous leaks in sunlight. Where present compositions are sufficiently thick to provide a good colored coating, they are so thick that the leak or defect in the container cannot be seen through the composition.

Additionally, many of the presently existing leak detection compositions are non-aqueous. Aqueous compositions are preferred for ease in cleaning the container and associated equipment being tested for leaks. Aqueous compositions are also easier to clean from clothing and the skin of the person testing for leaks.

The present invention was developed to overcome these problems and to provide an effective, convenient composition for detecting leaks in all types of systems, even including systems wherein there is a danger of combustion, such as oxygen systems.

SUMMARY OF THE INVENTION

A fluorescent leak detection composition comprising water, a nonionic surfactant having an HLB value of about 12 to about 14 in an amount effective to produce stable bubbling of the composition for a time sufficient to detect a leak in a container when the composition is applied to the surface thereof, about 0.025 to about 1.0 weight percent sodium fluorescein and a semisynthetic cellulose thickening agent in an amount effective to provide the composition with a viscosity of about 75 to about 125 cps at 20° C.

Preferably, the composition includes an antifreeze agent in an amount effective to retard freezing of the composition for a time sufficient to detect a leak when the composition is applied to a cold surface, such as refrigerant conduits.

The composition according to the present invention provides the following major advantages when compared to prior art compositions:

1. The fluorescent color provided by the sodium fluorescein makes it easy to detect leaks even in direct sunlight.
2. The composition may be effectively coated on and will cling to any surface, including vertical surfaces and rounded surfaces, without running off.
3. The composition as applied to a surface in a coating thick enough to cling to the surface is still sufficiently transparent to allow any holes, defects or cracks in the container to be visible through the composition.
4. The composition is water soluble.
5. The composition is reactive to ultraviolet light sources, if necessary.
6. The composition can be used with any type of system wherein fluid may be leaking from a container. This includes refrigeration systems wherein prior art compositions may freeze before the leak can be detected.
7. The composition is not combustible and, therefore, is ideally suited for use in detecting leaks of oxygen systems.

Other advantages will appear hereinafter.

DESCRIPTION OF THE PREFERRED EMBODIMENTS

The major component of the present composition is water. In addition to water, the composition includes ingredients to make the detection of leaks easier, including fluorescein dye, a thickening agent which makes it possible to provide a sufficiently thick coating of the composition on the surface to be tested, a nonionic, fairly hydrophilic surfactant to increase penetration of the composition and to promote stable bubbling of the composition, and, preferably, an antifreeze agent to retard freezing of the composition for a sufficient time to detect the leak when the composition is applied to a cold surface, such as refrigeration tubes.

Sodium fluorescein is the dye used to provide the composition with a fluorescent color to make leaks easier to detect. Sodium fluorescein was chosen because of its ability to provide a visible color in dilute quantities in an aqueous system. Generally, less than 0.025 weight percent sodium fluorescein does not provide sufficient intensity of color to be readily visible. For economic reasons, this amount of sodium fluorescein is the preferred amount. However, the amount of sodium fluorescein could be greatly increased, up to the point where its fluorescent green color tends to become yellow-green and harder to see. It is believed that this undesirable color becomes prevalent when the sodium fluorescein is present in about 1 weight percent of the total composition.

Sodium fluorescein is also known as uranine and resorcinolphthalein. It has a structure:

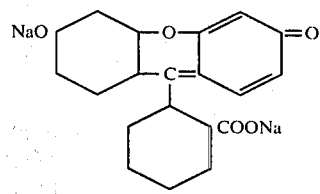

Sodium fluorescein has sensitivity to ultraviolet light which makes the detection of leaks using the composition according to the present invention easier than when using the typical soap solution compositions.

The thickening agent may be any type which does not interfere with the solubility or stability of the sodium fluorescein. Preferred thickening agents include the semisynthetic cellulose derivatives, such as carboxymethylcellulose, hydroxymethylcellulose, methylcellulose, ethylcellulose and mixtures thereof. Carboxymethylcellulose is the presently preferred thickening agent.

A sufficient quantity of thickening agent is used to be effective in providing the composition with a viscosity of about 75 to about 125 cps at 20° C. Within this range, the viscosity is low enough to permit the formation of bubbles when a gaseous leak is present and also give excellent cling time on vertical surfaces. More viscosity would tend to interfere with the bubbles and less viscosity would provide for a shorter and, perhaps unsuitable vertical cling time. It has been found that 1 weight percent of carboxymethylcellulose provides the composition with a suitable viscosity.

The surfactant can be any type which does not interfere with the solubility or stability of the sodium fluorescein. Preferably, the surfactant is a nonionic surfactant having a HLB (hydrophile-lipophile balance) value of about 12 to about 14. The HLB system of determining surfactants is well known to those skilled in the art and is described, for example, in a brochure entitled "ATLAS Surface Active Agents . . . Their Characteristics . . . The HLB System Of Selection", published by Atlas Powder Company, 1950.

Surfactants having an HLB value of about 12 to about 14 are fairly hydrophilic. The surfactant should be present in an amount effective to promote wetting, and hence penetration of the composition, and produce stable bubbling of the composition for a time sufficient to enable an observer to detect a leak in a container when the composition is applied to the surface thereof. The time period should be at least one minute, and preferably, about five minutes, minimally. Of course, bubbling will not occur unless a leak is present. The surfactant need be present in an amount capable of producing the stated bubbling when applied to the container surface should a leak be present. It is believed that about 7 to about 15 weight percent of surfactant will be sufficient to produce a composition having the desired properties.

Suitable surfactants include, for example, polyoxyethylene sorbitan monolaurate, with an HLB value of 13.3; polyoxyethylene sorbitan monooleate, with a HLB value of 13.9; polyoxyethylene sorbitol monolaurate, with an HLB value of 13.0; and polyoxyethylene sorbitol oleate-laurate, with an HLB value of 13.2. Other surfactants having the designated characteristics may be used.

The presently preferred surfactant is a dodecylbenzenesulfonic acid type surfactant of the kind available from Mars Chemical Corp., a subsidiary of AZS Company, Atlanta, Ga., under the name "Pro Conc I". 10 weight percent of "Pro Conc I" has been found to effectively promote penetration and bubbling of the composition.

A preferred ingredient, although not necessary for all uses of the composition, is an antifreeze agent in an amount effective to retard freezing of the composition for a sufficient time to detect a leak when the composition is applied to a cold surface. Since sodium fluorescein has a limited solubility in alcohol, ethylene glycol is the preferred antifreeze agent. When the composition contains 10 weight percent of ethylene glycol, it can be exposed to surfaces at 0° C. for 2 hours without freezing. The lower limit is defined by the amount of time necessary to make the determination of whether there is a leak, usually about five minutes, and the surface temperature of the container being tested. The upper limit is determined by economic considerations, about 20 weight percent being suitable.

As used herein, the terms "percent" and "weight percent" mean the percent of the ingredient or component under discussion based on the total weight of the composition, unless otherwise indicated.

The composition according to the present invention will now be described in more detail with reference to the following specific, non-limiting example:

| Ingredient | Weight Percent |
|---|---|
| Sodium fluorescein | 0.025 |
| Hydroxymethylcellulose | 1.0 |
| Pro Conc I | 10.0 |
| Ethylene glycol | 10.0 |
| Water | 78.975 |
| Total | 100.0 |

The ingredients listed above may be mixed together in any order, but preferably, the other ingredients are added to the water.

The present invention also includes the method of detecting a leak in a container as defined hereinbefore and comprises applying a thin coating of the composition according to the present invention to the surface of the container and detecting bubbling of the composition coating. The coating may be simply applied by daubing the composition around the pipe, conduit, receptacle or other container over the area where there is a suspected leak.

The present invention may be embodied in other specific forms without departing from the spirit or essential attributes thereof and, accordingly, reference should be made to the appended claims, rather than to the foregoing specification, as indicating the scope of the invention.

I claim:

1. A method of detecting a leak in a container comprising applying a thick coating to the exterior surface of the container of an aqueous fluorescent leak detection composition comprising water, a nonionic surfactant having an HLB value of about 12 to about 14 in an amount effective to promote wetting and bubbling of the composition for a time sufficient to detect a leak in the container, about 0.025 to about 1.0 weight percent sodium fluorescein, a semisynthetic cellulose thickening agent in an amount effective to provide the composition with a viscosity of about 75 to about 125 cps at 20° C., and an antifreeze agent in an amount effective to retard freezing of the composition for a sufficient time to detect a leak when the composition is applied to a cold surface, and detecting bubbling of the composition in the presence of a leak.

2. An aqueous fluorescent leak detection composition comprising water, a nonionic surfactant having an HLB value of about 12 to about 14 in an amount effective to promote wetting and bubbling of the composition for a time sufficient to detect a leak in a container when the composition is applied to the surface thereof, about 0.025 to about 1.0 weight percent sodium fluorescein, a semisynthetic cellulose thickening agent in an amount effective to provide the composition with a viscosity of about 75 to about 125 cps at 20° C., and an antifreeze agent in an amount effective to retard freezing of the composition for a sufficient time to detect a leak when the composition is applied to a cold surface.

3. A composition according to claim 1 wherein the surfactant is selected from the group consisting of polyoxyethylene sorbitol monolaurate, polyoxyethylene sorbitol oleate-laurate, polyoxyethylene sorbitan monolaurate, polyoxyethylene sorbitan monooleate, dodecylbenzenesulfonic acid type surfactant and mixtures thereof.

4. A composition according to claim 1 wherein the antifreeze agent is ethylene glycol present in an amount of about 10 to 20 weight percent.

5. A composition according to claim 1 wherein the thickening agent is selected from the group consisting of carboxymethylcellulose, hydroxymethylcellulose, methylcellulose, ethylcellulose and mixtures thereof.

6. A composition according to claim 1 wherein the thickening agent is carboxymethylcellulose present in an amount of about 1 weight percent.

7. A composition according to claim 1 which is sufficiently transparent as applied to a surface to allow any holes or cracks in the surface to be visible through the composition.

8. An aqueous fluorescent leak detection composition comprising water, about 10 weight percent of a nonionic dodecylbenzenesulfonic acid type surfactant having an HLB value of about 12 to about 14, about 0.25 weight percent sodium fluorescein, about 1 weight percent carboxymethylcellulose and about 10 weight percent ethylene glycol.

* * * * *